United States Patent [19]

Ruster et al.

[11] Patent Number: 5,509,633
[45] Date of Patent: Apr. 23, 1996

[54] REMOVABLE AND ADJUSTABLE CUP HOLDER FOR A VEHICLE

[75] Inventors: Thomas W. Ruster, Brighton; Nancy K. MacBrien, Canton, both of Mich.

[73] Assignee: General Motors Corporation, Detroit, Mich.

[21] Appl. No.: 358,118

[22] Filed: Dec. 19, 1994

[51] Int. Cl.⁶ ........................................ A47K 1/08
[52] U.S. Cl. .................. 248/311.2; 220/23.8; 220/575; 220/902; 224/926
[58] Field of Search ........................ 248/311.2, 314, 248/309.1, 312, 312.1, 316.2, 316.3; 296/37.8, 37.14; 224/42.42; 220/575, 23.8, 902; 297/188.14

[56] References Cited

U.S. PATENT DOCUMENTS

| | | | |
|---|---|---|---|
| 4,962,855 | 10/1990 | Holmquist | 220/23.8 X |
| 5,018,633 | 5/1991 | Toth et al. | 248/314 X |
| 5,346,070 | 9/1994 | McSpadden | 220/575 X |
| 5,390,798 | 2/1995 | Yanuzzi | 220/23.8 X |

*Primary Examiner*—Ramon O. Ramirez
*Attorney, Agent, or Firm*—Charles E. Leahy

[57] ABSTRACT

A cup holder for a vehicle includes a vehicle panel having a horizontal support surface and a pair of opposing spaced apart walls rising above the support surface and defining the dimensional extent of the support surface. A block of compressible foam material is adapted for placement on the support surface and has at least one cavity therein adapted to hold a cup. The block of foam has opposed end walls spaced apart to fit closely between the spaced apart walls of the vehicle panel so that the block of foam material is held in place by the interaction of the respective end walls of the block and the vehicle panel. The block is removable from the vehicle panel by compressing the foam block to effect this engagement of the end walls of the foam block from the vehicle panel end walls.

4 Claims, 3 Drawing Sheets

REMOVABLE AND ADJUSTABLE CUP HOLDER FOR A VEHICLE

The invention relates to a cup holder for a motor vehicle. More particularly, a cup holder defined by a block of compressible foam, removably and adjustably mounted on a support panel of a vehicle body.

BACKGROUND OF THE INVENTION

It is well known in motor vehicles to provide a cup holder accessory for receiving a cup such as a coffee cup or a soft drink can.

SUMMARY OF THE INVENTION

A cup holder for a vehicle includes a vehicle panel having a horizontal support surface and a pair of opposing spaced apart walls rising above the support surface and defining the dimensional extent of the support surface. A block of compressible foam material is adapted for placement on the support surface and has at least one cavity therein adapted to hold a cup. The block of foam has opposed end walls spaced apart to fit closely between the spaced apart walls of the vehicle panel so that the block of foam material is held in place by the interaction of the respective end walls of the block and the vehicle panel. The block is removable from the vehicle panel by compressing the foam block to effect this engagement of the end walls of the foam block from the vehicle panel end walls.

DESCRIPTION OF THE PREFERRED EMBODIMENT

Figure 1:
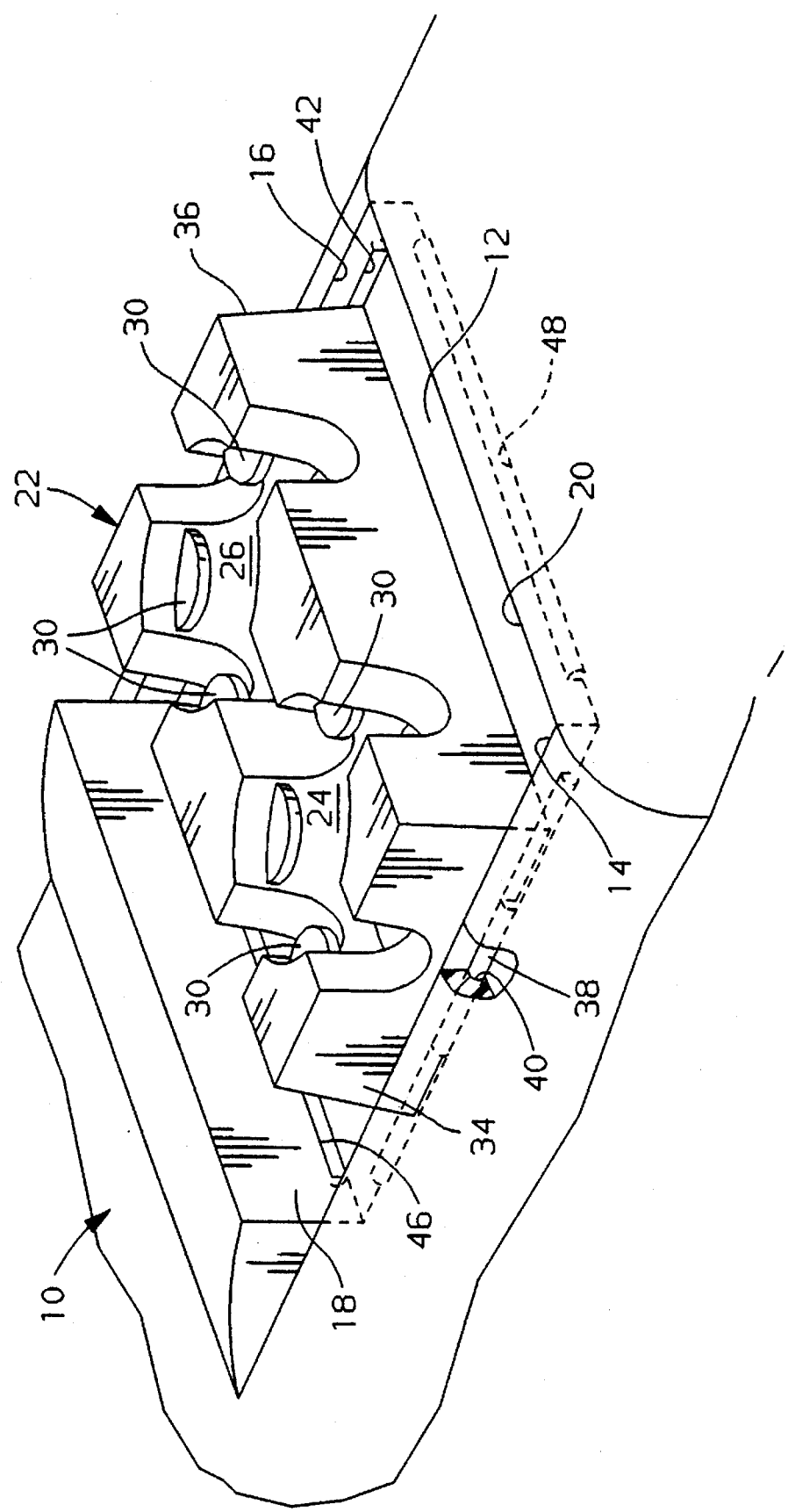
FIG. 1 is a perspective view of a motor vehicle panel having a cup holder according to the invention, installed to mount two cups side-by-side.

Referring to FIG. 1, it is seen that a vehicle body panel 10, such as a console, has a horizontal support surface 12 defined by spaced apart side walls 14 and 16 and front wall 18 and rear wall 20. The support surface 12 and the walls 14, 16, 18 and 20 are preferably integrally molded plastic members. The walls 14 and 16 are spaced apart by the same distance as the distance between the forward wall 18 and rear wall 20 so that the support surface 12 is a square shape.

A cup holder assembly 21 is a molded block of soft compressible foam material 22 and defines the first cup holder cavity 24 and a second cup holder cavity 26 for receiving cups. The cavities 24 and 26 preferably have open bottoms so that the cup will rest upon the horizontal surface 12 of the vehicle panel 10. In addition, each cup holder cavity has a plurality of flexible fingers 30 which project into the cavity to bear against the side walls of the cup and thereby steady the container within the cavity.

As seen in FIG. 1, the molded foam block 22 has end walls 34 and 36 which are spaced apart at approximately the same distance as the distance between the side walls 14 and 16 of the vehicle panel. This spacing between the end walls 34 and 36 can be greater than the spacing between the walls 14 and 16 so that the foam block is compressibly wedged between the side walls 14 and 16 to retain the foam block 22 in place. Alternatively, and as shown in the drawing, the foam block 22 may have integrally molded projections 38 and 39 extending from the end walls 34 and 36 into recesses 40 and 42 molded in the side walls 14 and 16 of the vehicle panel. The interfit between the foam projections and their mating recesses effectively retain the foam block 22 on the vehicle panel 10. In addition, the recess 40 is preferably substantially longer than the length of the projection 38 so that the foam block 22 can be slid fore and aft along the support surface 12 to the particular position desired by the vehicle user.

Figure 2:
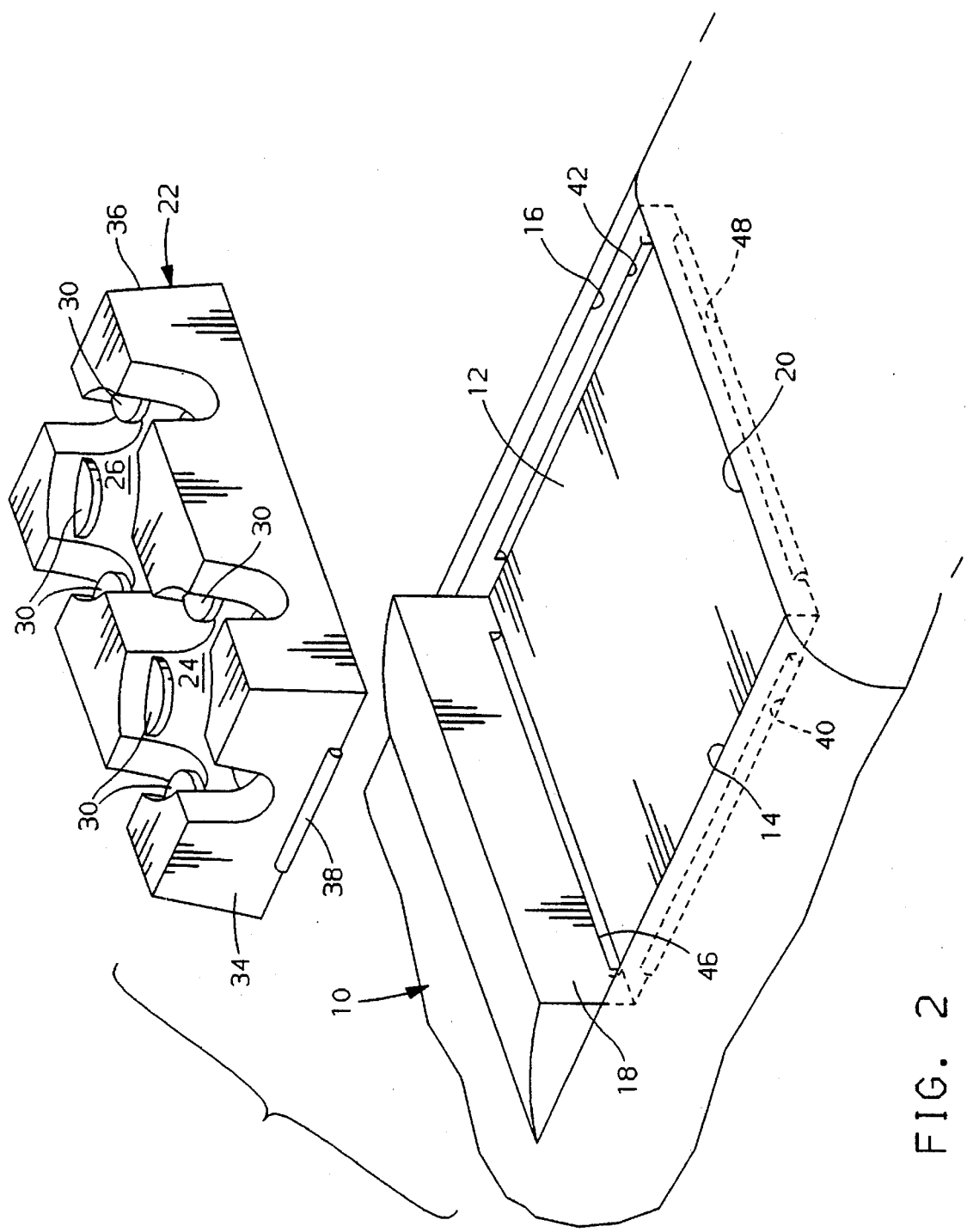
FIG. 2 is a view similar to FIG. 1 but showing the cup holder removed from the vehicle panel to provide a open, clear support surface for storage or other use by the vehicle occupant.

As seen in FIG. 2, the cup holder block 22 can be completely removed from the vehicle for cleaning or to create an open storage-surface. This removal is permitted by the yieldable compressible nature of the foam block 22 by which the end walls 34 and 36 and their projections can be disengaged from the side walls 14 and 16 of the support panels by either compressing or bending the foam block.

Figure 3:
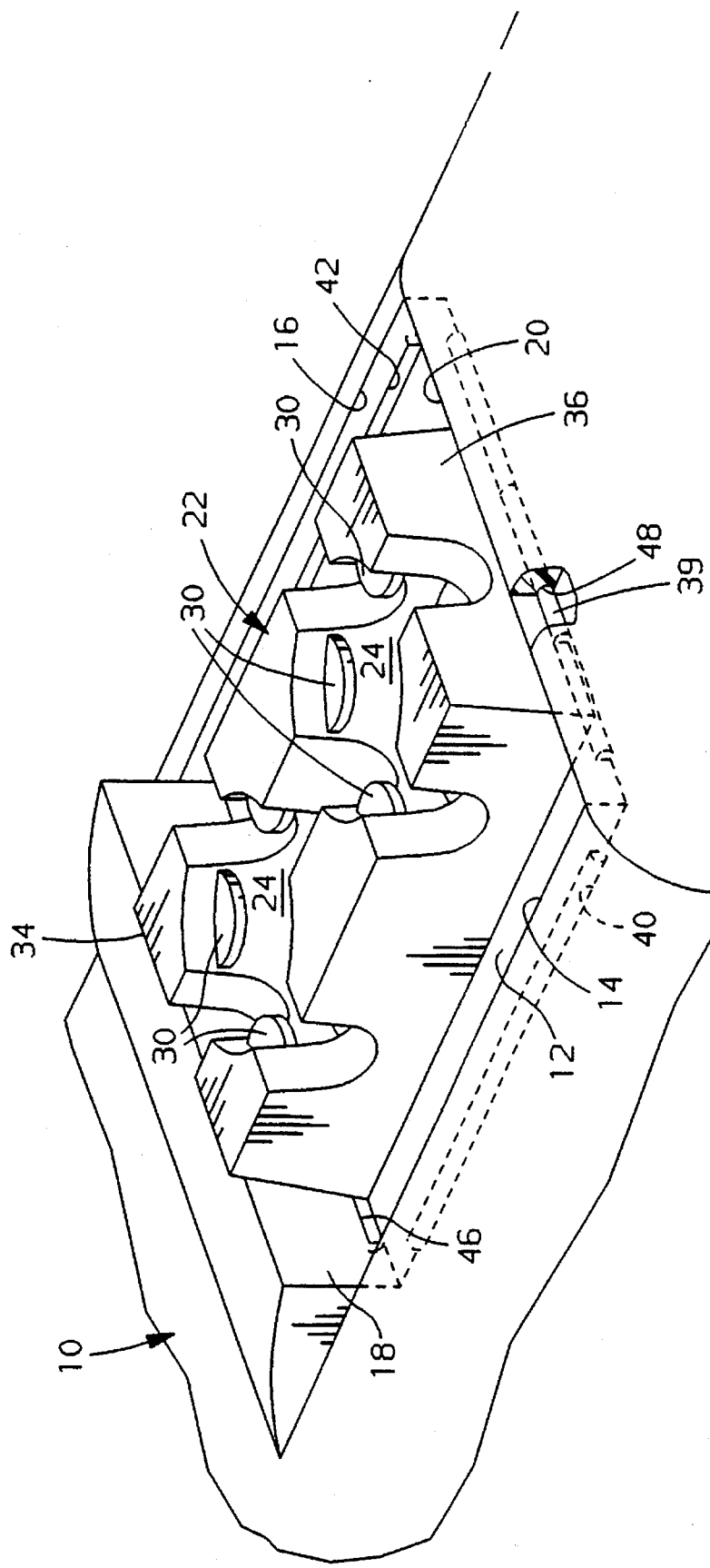
FIG. 3 is a view similar to FIG. 1 but showing the cup holder having been turned 90 degrees to arrange a pair of cups in fore and aft positions.

FIG. 3 shows the cup holder assembly 22 reinstalled in the vehicle but turned 90 degrees to orient the cups in fore and aft relationships. The front wall 18 and rear wall 20 respectively have recesses 46 and 48 for receiving the projections 38 and 39 molded on the foam block. The recesses 46 and 48 are longer than the projections 38 and 39 so that the foam block 22 can be slid sideways along the support surface to any desired position.

If desired, the occupant can completely remove the cup holder block from the vehicle and use the support surface for storage or any other purpose.

Thus, the invention provides a new and improved cup holder for a motor vehicle.

The embodiments of the invention in which an exclusive property or privilege is claimed are defined as follows:

1. A cup holder for a vehicle comprising:

a vehicle panel having a horizontal support surface and a pair of opposing spaced apart walls rising above the support surface and defining the dimensional extent of the support surface, and a block of compressible foam material adapted for placement on the support surface and having at least one cavity therein adapted to hold a cup, said block of foam having opposed end walls spaced apart to fit closely between the spaced apart walls of the vehicle panel whereby the block of foam material is held in place by the interaction of the respective end walls of the block and the vehicle panel, and the block is removable from the vehicle panel by compressing the foam block to effect disengagement of the spaced apart end walls of the foam block from the vehicle panel end walls.

2. A cup holder for a vehicle comprising:

a vehicle panel having a horizontal support surface and a pair of opposing spaced apart walls rising above the support surface and defining the dimensional extent of the support surface, said spaced apart walls having recesses formed therein; and a block of compressible foam material adapted for placement on the support surface and having at least one cavity therein adapted to hold a cup, said block of foam having opposed end walls spaced apart to fit closely between the spaced apart walls of the vehicle panel and having projections formed integral on the foam whereby the block of foam material is held in place by the interaction of the respective end walls of the block and the vehicle panel, and the block is removable from the vehicle panel by compressing the foam block to effect disengagement of the end walls of the foam block from the vehicle panel spaced apart walls.

3. The cup holder of claim 2 further characterized by the dimensional length of the recesses exceeds the length of the projections on the foam block so that the foam block can be variably located along the support surface by sliding the foam block along the support surface as permitted by the sliding of the projections within the recess.

4. A beverage container holder for a vehicle comprising:

a vehicle panel having a square horizontal support surface with the sides thereof defined by a first and second pairs of opposing spaced apart walls rising above the support surface and defining the dimensional extent of the support surface, a recess formed in each of the walls of the vehicle panel;

a rectangular block of compressible foam material adapted for placement on the support surface and having at least one cavity therein adapted to hold a cup, said block of foam having a length defined by first pair of opposed walls spaced apart to fit closely between the spaced apart walls of the vehicle and having integral projections extending therefrom into the recesses of the walls whereby the block of foam material is held in place by the interaction of the respective end wall projections of the block and the recesses of the vehicle panel, said block is removable from the vehicle panel by compressing the foam block to effect disengagement of the end walls of the foam block from the vehicle panel end walls, and said block of foam having a width smaller than the distance between the opposed spaced apart walls of the vehicle panel so that the foam block can be variably located along the support surface by sliding the foam block along the support surface as permitted by the sliding of the projections within the recess.

* * * * *